INVENTORS
LESTER J. LIMBAUGH AND
EMRYS C. JAMES

BY Carl V. Olson
ATTORNEY

RANDOM ACCESS OPTICAL SOUND TRACK REPRODUCER WITH AUTOMATIC GAIN CONTROLLED AMPLIFIERS RESPONSIVE TO A REFERENCE ZONE ON EACH TRACK

Filed July 22, 1968

INVENTORS
LESTER J. LIMBAUGH AND
EMRYS C. JAMES
BY Carl V. Olson
ATTORNEY

RANDOM ACCESS OPTICAL SOUND TRACK REPRODUCER WITH AUTOMATIC GAIN CONTROLLED AMPLIFIERS RESPONSIVE TO A REFERENCE ZONE ON EACH TRACK

Filed July 22, 1968 4 Sheets-Sheet 3

INVENTORS
LESTER J. LIMBAUGH AND
EMRYS C. JAMES
BY Carl V. Olson
ATTORNEY

INVENTORS
LESTER J. LIMBAUGH AND
EMRYS C JAMES
BY Carl V. Olson
ATTORNEY

United States Patent Office 3,536,858

Patented Oct. 27, 1970

3,536,858

RANDOM ACCESS OPTICAL SOUND TRACK REPRODUCER WITH AUTOMATIC GAIN CONTROLLED AMPLIFIERS RESPONSIVE TO A REFERENCE ZONE ON EACH TRACK

Lester J. Limbaugh, North Palm Beach, and Emrys C. James, Palm Beach Gardens, Fla., assignors to RCA Corporation, a corporation of Delaware

Filed July 22, 1968, Ser. No. 746,666
Int. Cl. G11b *7/00;* H03g *3/32*
U.S. Cl. 179—100.3 7 Claims

ABSTRACT OF THE DISCLOSURE

An audio reproducing equipment including a relatively-movable medium such as a rotatable film cylinder having a plurality of optically-recorded sound tracks, a light source positioned to illuminate at least an elemental portion at a time of all of the sound tracks, a plurality of light-responsive cells each positioned to receive light from a respective one of the tracks, a plurality of amplifiers each having an input connected to a respective light-responsive cell, and switching means to select the output of any desired one of the amplifiers. Each of the sound tracks is constructed to include a reference density zone followed by a varying-density message zone, the reference zone includes regions of maximum and minimum optical density. Each amplifier includes an automatic gain control circuit responsive to the output of the respective amplifier when the sound track reference zone is scanned, and which is operative to set the gain of the amplifier to a value that produces a standardized output when the message zone is scanned.

BACKGROUND OF THE INVENTION

Information or results can be conveyed from an electronic data processing equipment to a human operator by a print-out unit, a display unit or an audio unit. An audio unit may include many voice messages prerecorded on a photographic film and arranged so that any appropriate one of them may be selected for reproduction under the control of a data processor. The audio messages may give telephone numbers, stock quotations, or any other type of information following a request to the computer. The audio unit may include means to select and reproduce any one of many simultaneously-available words, followed by one of many other words, and so on, in a meaningful sequence. Known audio units of this type have suffered from a lack of desired uniformity in the amplitudes of the audio signals reproduced from the many photographic recordings.

SUMMARY OF THE INVENTION

In accordance with an example of the invention, the many simultaneously-reproducible sound tracks on an endless photographic recording medium are each provided with a reference density region which is followed by a message recording. A light-responsive cell and an electrical signal amplifier are associated with each sound track on the film. Each amplifier includes an automatic gain control circuit which is constructed to respond to the electrical signal level present during scanning of the reference density region on the associated track, and to set the gain of the amplifier to a correct value throughout the time required to scan the associated message recording on the track. The reference density regions in all tracks are made to have the same identical reference density, and the automatic gain control circuits in all amplifiers are referenced to a constant voltage source, so that the system compensates for all unavoidable differences in the characteristics of the many optical and electrical paths and permits unlimited intermixing of the reproduced audio message signals.

DESCRIPTION OF THE PREFERRED EMBODIMENT

Figure 1:
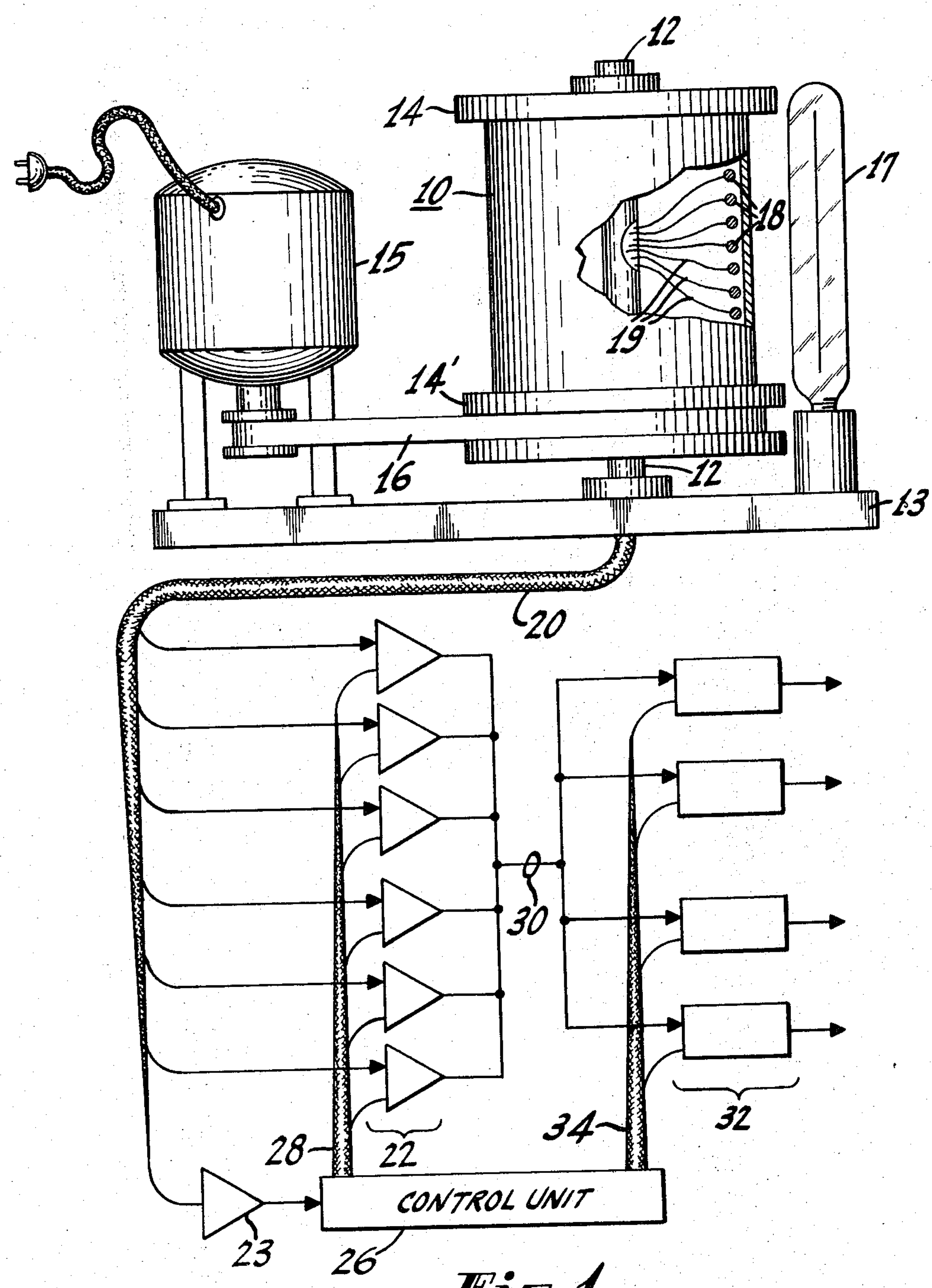
FIG. 1 is a diagram of the overall system of an audio reproducing equipment constructed according to the teachings of the invention.

The audio reproducing equipment shown in FIG. 1 includes a cylindrical photographic film 10 on which there are recorded a plurality of optical sound tracks. The film 10 is mounted for rotation about a stationary shaft 12, fixed on a base 13, by means of end caps 14 and 14' which are journalled for rotation on shaft 12. The film cylinder 10 is rotated by an electrical motor 15 which drives a belt 16, which in turn rotates the end cap 14'.

An electric lamp 17 is mounted to illuminate a longitudinal line along the cylindrical surface of the film 10. The optically recorded sound tracks on the film 10 extend circumferentially around the film cylinder. A plurality of stationary light responsive cells 18 are mounted inside the film cylinder in alignment with respective optically recorded sound tracks on the film. Each cell 18 responds to varying amounts of light from the lamp 17 through an associated optical sound track on film 10, and is operative to generate a corresponding electrical signal. The electrical signal is conveyed over wires 19, which are collected as a cable at 20, and connected to individual respective amplifiers 22 and 23. The amplifiers 22 are associated with respective message sound tracks on the cylindrical film 10. The amplifier 23 is associated with an indexing track on the cylinder film 10. While the system in FIG. 1 is illustrated as including seven light responsive cells associated with six message tracks and one index track, a much larger number of light message tracks and corresponding light responsive cells may be employed.

The output of the index track signal amplifier 23 is applied to a control unit 26. The control unit 26 includes means synchronized by the indexing input thereto for applying signals over wires 28 to the amplifiers 22 to selectively enable outputs from the amplifiers to wires in a multiconductor cable 30. The wires in the cable 30 are connected to supply signals thereon to sample-and-hold circuits in a plurality of output channel units 32. The control unit 26 also includes means for generating control signals that are applied over wires 34 to control the gating of signals into and out of the channel units 32. The multi-conductor cable 30 includes a wire from each of the six amplifiers 22 to inputs of all four of the channel units 32. That is, signal path wires are provided from all six amplifiers 22 to all four channel units 32. The control unit 26 controls the ones of the amplifiers 22 from which signal outputs are coupled, and the ones of the channel units 32 to which the signals are supplied. The signals from a channel unit 32 may be time division multiplexed samples of the signals from some or all of the amplifiers 22. The control unit 26 may in turn be controlled by an electronic data processing equipment (not shown).

Figure 2:
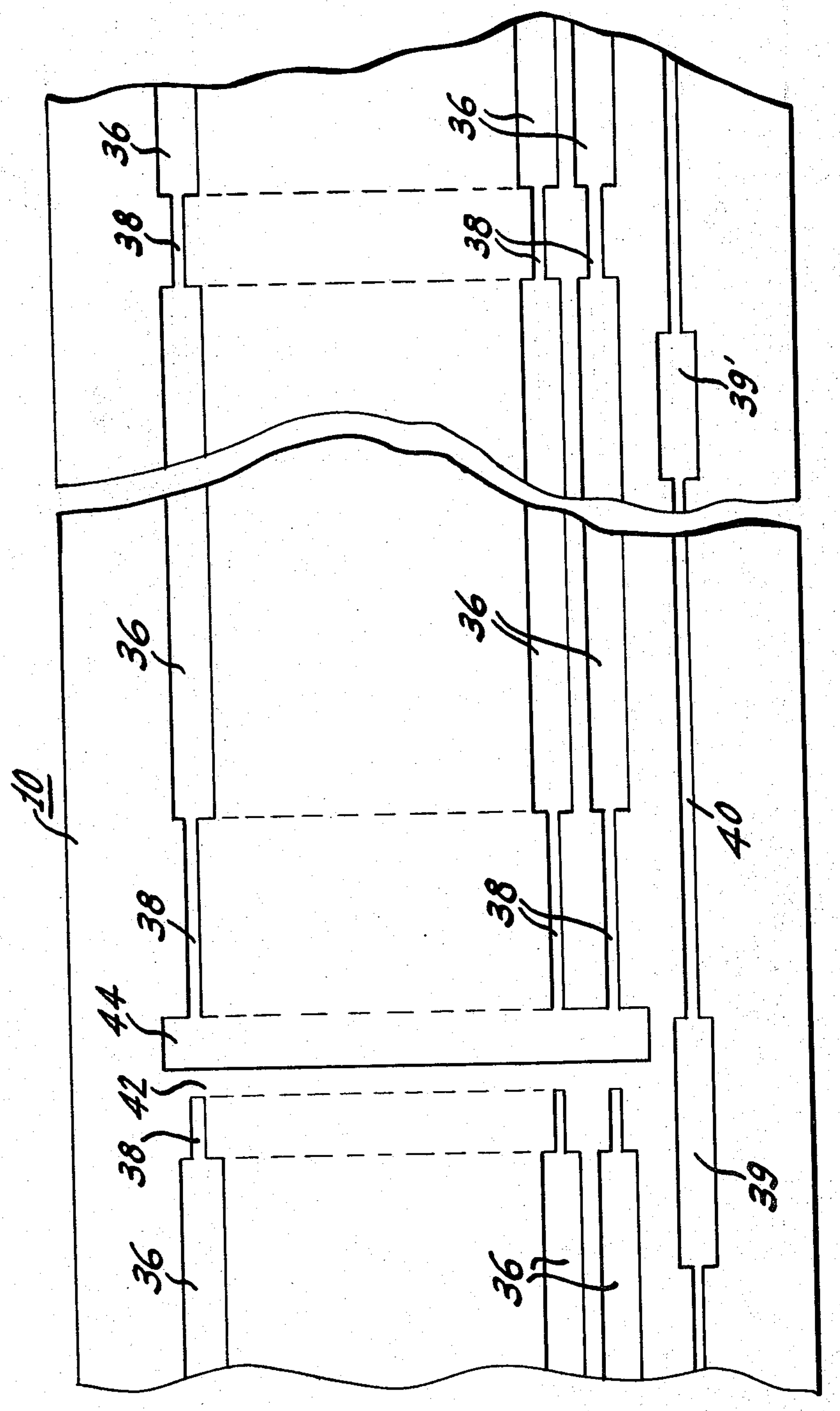
FIG. 2 is a fragmentary view of a portion of a multi-track photographic film recording which is mounted in cylindrical form for rotation in the system of FIG. 1.

FIG. 2 shows a fragmentary portion of the cylindrical film 10 as it appears when laid out flat. The areas 36 represent audio message portions of three tracks optically recorded on the magnetic film 10. Additional similar parallel message tracks are provided on the film 10, but have been omitted from the drawing. The film 10 is completely opaque except along the recorded tracks. Each message region 36 of a track is transparent to a modulated extent corresponding with the audio message information recorded thereby.

Message regions 36 of a given track are connected by constricted transparent lines 38. The film 10 also includes an indexing track consisting of enlarged transparent regions 39 and 39′ and constricted connecting transparent lines 40. The indexing region 39 is physically related to the beginnings and ends of all of the message tracks. The indexing region 39′ is physically related with the beginnings and ends of word or phrase portions of the message tracks.

Figure 4:
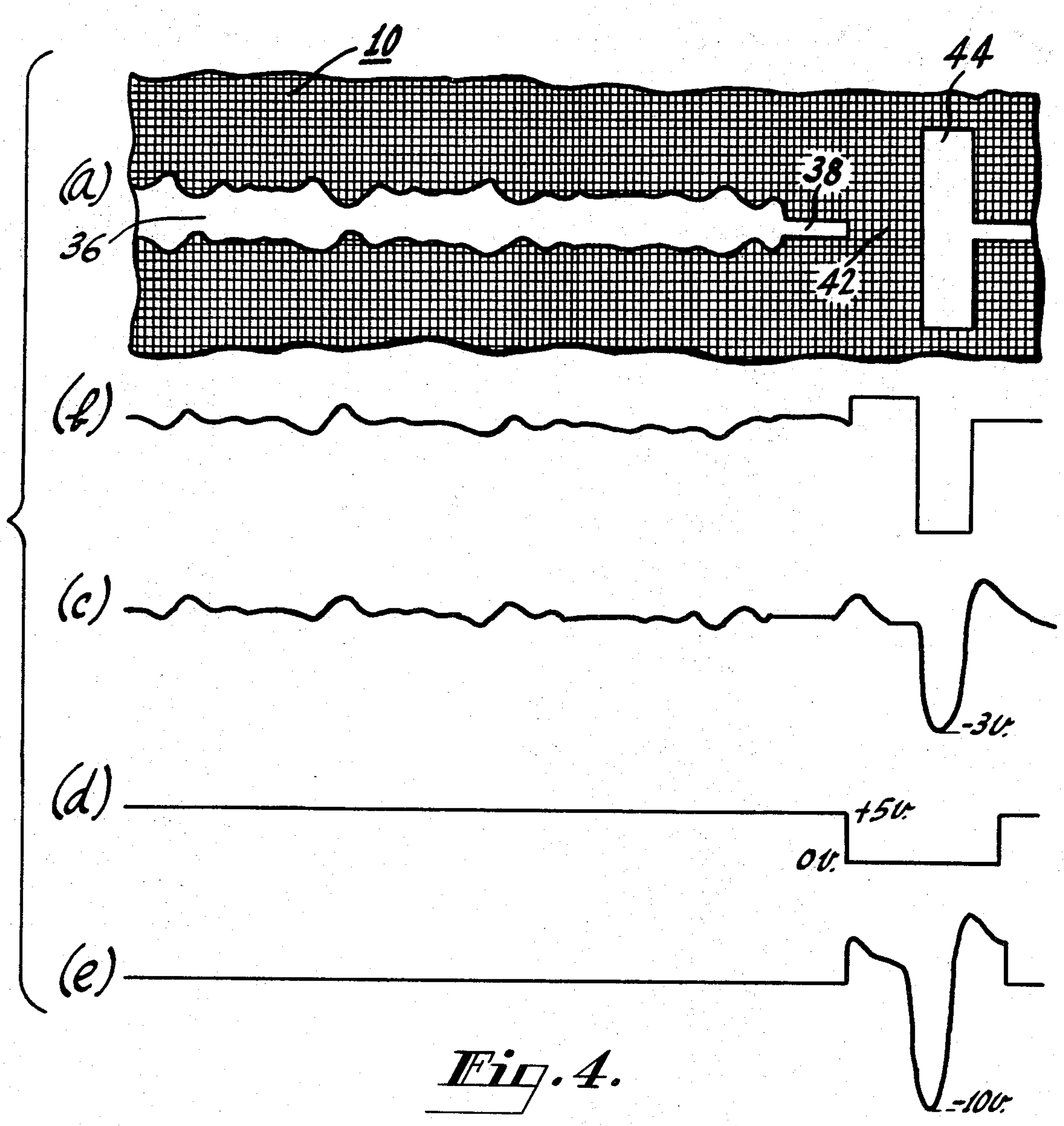
FIG. 4 is a chart which will be referred to in explaining the operation of the system of FIG. 1 and the circuit of FIG. 3.

Each optically recorded sound track includes a reference density zone between the beginning and end of the varying-density message zone. Each reference density zone includes an opaque region 42 followed by a transparent region 44. FIG. 4(*a*) shows an enlarged fragmentary portion of the film 10 including a modulated transparent message region 36 of a track, a constricted transparent connecting line 38 of the track, and a reference density zone including an opaque region 42 followed by a transparent region 44.

Figure 3:
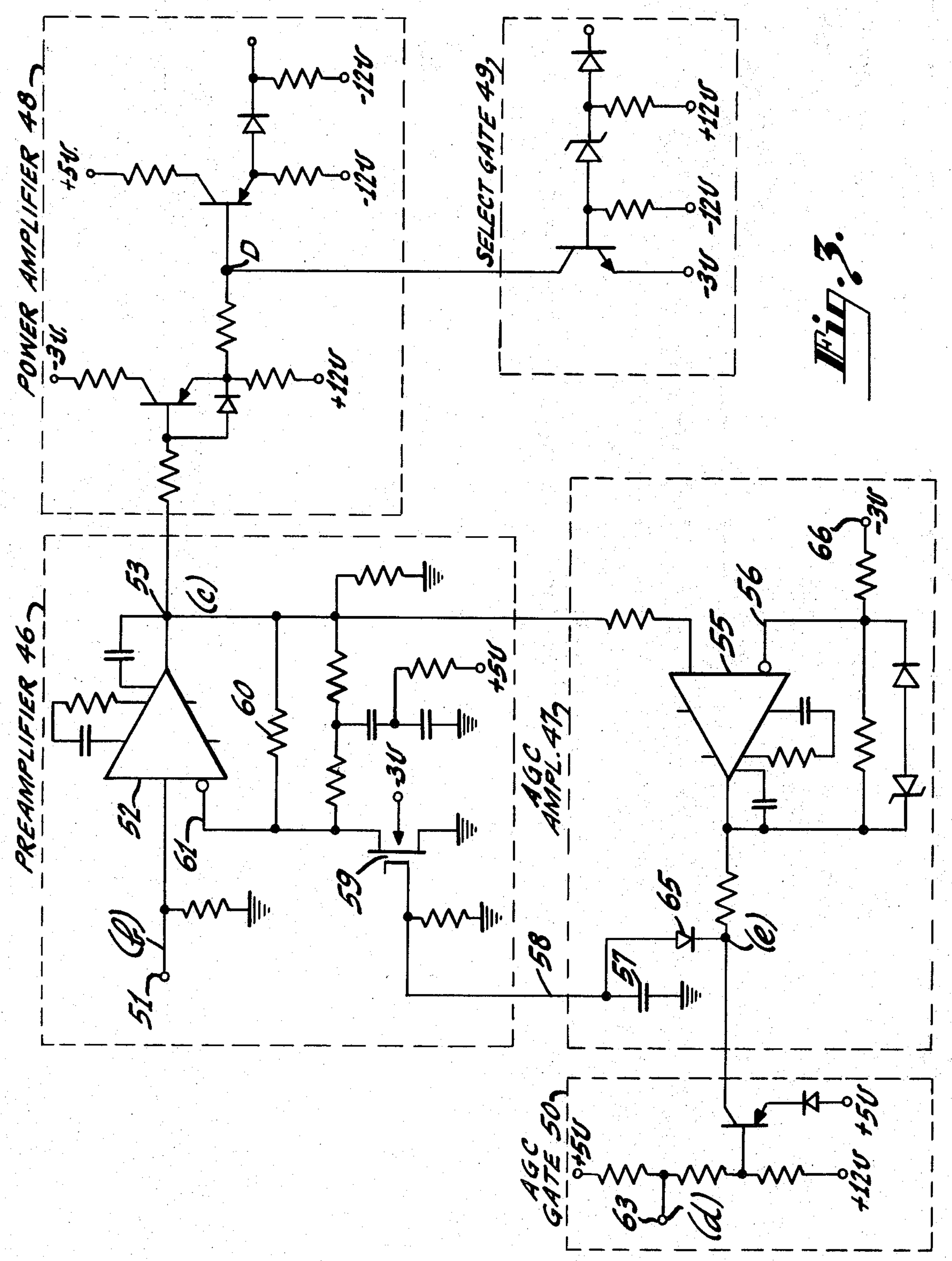
FIG. 3 is a circuit diagram of an amplifier suitable for use in the system of FIG. 1.

Reference is now made to FIG. 3 for a description of an amplifier circuit suitable for use in each of the six amplifier boxes 22 in FIG. 1. The amplifier of FIG. 3 includes a pre-amplifier 46, an automatic gain control (AGC) amplifier 47 connected to control the gain of pre-amplifier 46, a power amplifier 48 connected to amplify signals from pre-amplifier 46, and a selection gate 49 connected to gate the power amplifier 48. The gated output of the power amplifier 48 consists of periodically recurring samples of the amplified signals, so that the outputs of a number of power amplifiers can be time division multiplexed. The amplifier also includes an optional AGC gate 50 for limiting operation of the AGC amplifier 47 to the period of time when the reference zone on the corresponding track is scanned.

Pre-amplifier 46 has a signal input terminal 51 which is connected over a wire in the cable 20 (FIG. 1) to a corresponding one of the light responsive cells 18 associated with a corresponding one of the message tracks on film 10. The electrical signal thus supplied to terminal 51 of the pre-amplifier may be as illustrated in FIG. 4(*b*), where the signal amplitudes may be measured in millivolts. The signal input to the pre-amplifier 46 is applied therein to an input of a conventional operational amplifier 52, which may be a Type 709 integrated circuit operational amplifier. Operational amplifiers are described in an article by J. F. Gifford and M. Markkula in the Nov. 27, 1967, issue of Electronics magazine at pages 84–93. The output at 53 of the operational amplifier may be as shown in FIG. 4(*c*), where signal amplitudes may be measured in volts, and where a maximum excursion at the time of scanning the transparent reference zone region 44 may have a value of —3 volts.

The output at 53 from the pre-amplifier 46 is coupled over a line 54 to the input of a similar operational amplifier 55 in the AGC amplifier 47. The other input 56 of the AGC operational amplifier 55 is coupled at terminal 66 to a reference voltage source having a value of —3 volts. The same standard reference voltage source is used for all of the amplifiers 22 in FIG. 1. The operational amplifier 55 is a differential amplifier which amplifies the signal from the pre-amplifier 46 when that signal has a value more negative than the —3 volt reference signal. The output of the AGC operational amplifier 55 is coupled to a storage capacitor 57, which in turn is connected over line 58 to the control electrode of a MOS transistor 59. The charge stored on capacitor 57 controls the conductivity or resistance of the MOS transistor 59.

The resistance of transistor 59, in combination with the fixed resistance of resistor 60, controls the amplitude of a signal fed back from the output 53 of operational amplifier 52 to the input 61 of the operational amplifier 52.

The automatic gain control loop is arranged so that if, during scanning of the reference zone on the track, the negative signal at the output 53 of operational amplifier 52 exceeds the —3 volt reference applied to the AGC operational amplifier 56, the AGC operational amplifier 55 will conduct and charge capacitor 57 in the negative direction. An increased negative charge on capacitor 57 increases the resistance of the MOS transistor 59, and thereby decreases the gain of the pre-amplifier operational amplifier 52. The time constants of the AGC loop are constructed so that during the normal repetitive operation of scanning a track, the gain of the pre-amplifier operational amplifier 52 is maintained at a substantially constant value referenced to the signal amplitude occurring during scanning of the transparent reference zone 44 on the film. The gains of all amplifiers 22 are maintained at values such that the message signals from all of the amplifiers 22 in the system are at substantially the same level. The described AGC system compensates for all variations in the characteristics of the respective light responsive cell, and variations in other circuit components between the light responsive cell and the output point 53 of the pre-amplifier 46.

The transparent region 44 in the reference zone of each track produces a sufficiently large electrical signal, compared with the maximum signal produced during scanning of the message zone, so that the AGC system responds solely during scanning of the reference zone. However, as a precaution against noise effects occurring during scanning of the message zone, the AGC amplifier 47 may be gated by gate 50 to respond solely during scanning of the reference zone. This is accomplished by applying a gating signal as shown in FIG. 4(d) from control unit 26 to the input terminal 63 of the gate 50. The timing of the gating signal is synchronized by the indexing signal derived from the indexing track, amplified in amplifier 23 and supplied to the control unit 26. The gate 50 inhibits the AGC amplifier 47 from affecting the charge on capacitor 57 at all times except during scanning of the reference zone. The effect of gate 50 on the output of AGC operational amplifier 56 is illustrated in FIG. 4(e). The diode 65 passes only the negative polarity portions of the output from operational amplifier 55 to the storage capacitor 57.

The inclusion in the reference density zone of an opaque region 42 preceding the transparent region 44 ensures that the magnitude of the optical signal transition occurring therebetween will be fully standardized and unaffected by the preceding message zone. The resulting voltage excursion at the output of the corresponding pre-amplifier 46 then provides a measure of the combined characteristics of the light source 17, the optical path, the light-responsive cell and the pre-amplifier. If the voltage excursion at the output of the pre-amplifier 46 differs from a reference value, such as —3 volts, the gain of the pre-amplifier is automatically controlled to make the output signal equal to the reference voltage. The pre-amplifier gain remains at the set value during scanning of the message zone on the film, and is readjusted if necessary solely during the scanning of the reference density zone on the film.

Since the reference density zone on the film bears a predetermined relation with the varying-density message zone, and since the output of the pre-amplifier is set at a reference value during scanning of the reference density zone, it follows that the output of the pre-amplifier during scanning of the message zone has a desired standardized amplitude or level. The electrical signals from all other pre-amplifiers are similarly referenced to the —3 volt value. Therefore, the electrical message signals from all pre-amplifiers are at the same level, so that they can be selected and combined in any desired sequence, and also can be time division multiplexed over a single communications channel.

What is claimed is:

1. An audio reproducing equipment including a relatively-movable medium having a plurality of optically-recorded sound tracks each including a reference density zone followed by a varying-density message zone, a light source positioned to illuminate at least an elemental portion at a time of all of said sound tracks, a plurality of light-responsive cells each positioned to receive light from a respective one of said tracks, a plurality of amplifiers each having an input connected to a respective light-responsive cell, a common standard voltage source, and a plurality of automatic gain control circuits all responsive to said common standard voltage source and each responsive to the output of a respective amplifier when the sound track reference zones are scanned, all automatic gain control circuits being operative to set the gains of the respective amplifiers to values that produce standardized outputs during scanning of the message zones.

2. An equipment as defined by claim 1, and in addition, indexing means for said relatively-movable medium, and gate means responsive to said indexing means to enable said automatic gain control circuit solely during scanning of said reference density zone.

3. An equipment as defined by claim 1 wherein said reference zone includes a region having a density and dimension resulting in the direction of a greater amount of light to the respective light-responsive cell than occurs during scanning of the message zone.

4. An equipment as defined by claim 3 wherein said automatic gain control circuit includes a reference voltage threshold intermediate the amplifier output signal levels present when scanning the reference and message zones, and wherein said gain control circuit responds solely to a signal exceeding said threshold and present when scanning the reference zone.

5. An equipment as defined by claim 1 wherein said reference zone includes a region of one extreme density followed by a region of the other extreme density.

6. An equipment as defined by claim 5 in which said message zone includes densities in a limited range between and not including said two extreme densities.

7. An equipment as defined by claim 6 wherein said one extreme density directs a minimum amount of light and said other extreme density directs a maximum amount of light, to the respective light-responsive cell.

References Cited

UNITED STATES PATENTS

| | | | |
|---|---|---|---|
| 3,382,461 | 5/1968 | Wolcott | 330—38 |
| 3,300,591 | 1/1967 | Gushue | 179—100.3 |
| 3,195,113 | 7/1965 | Giordano | 340—173 |
| 3,221,337 | 11/1965 | Quinn | 340—173 |

STANLEY M. URYNOWICZ, Jr., Primary Examiner

J. ROSENBLATT, Assistant Examiner

U.S. Cl. X.R.

330—29